United States Patent
Matsuoka et al.

(10) Patent No.: US 6,552,894 B2
(45) Date of Patent: Apr. 22, 2003

(54) ELECTRIC DOUBLE LAYER CAPACITOR

(75) Inventors: Toshiyuki Matsuoka, Wako (JP); Kenji Matsumoto, Wako (JP); Tomokazu Shohoji, Wako (JP); Kentaro Shibuya, Wako (JP); Yoshio Yamamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,254

(22) Filed: Aug. 6, 2002

(65) Prior Publication Data

US 2002/0191370 A1 Dec. 19, 2002

Related U.S. Application Data

(62) Division of application No. 09/643,975, filed on Aug. 22, 2002, now Pat. No. 6,456,484.

(30) Foreign Application Priority Data

Aug. 23, 1999 (JP) ............................................ 11-235810
Aug. 24, 1999 (JP) ............................................ 11-237540
Aug. 24, 1999 (JP) ............................................ 11-237548

(51) Int. Cl.[7] .............................. H01G 9/04; H01G 9/00
(52) U.S. Cl. ....................................... 361/502; 361/511
(58) Field of Search ................................ 361/502, 503, 361/508–520

(56) References Cited

U.S. PATENT DOCUMENTS 4,546,415 A   10/1985   Kent et al.
5,579,203 A   11/1996   Klaschka

FOREIGN PATENT DOCUMENTS

JP   10294101   11/1998

Primary Examiner—Chau N. Nguyen
Assistant Examiner—Eric Thomas
(74) Attorney, Agent, or Firm—Merchant & Gould, P.C.

(57) ABSTRACT

An electric double layer capacitor having an electrode rolled body contained in an outer packaging can is disclosed. The electrode rolled body includes a positive electrode plate having a positive electrode foil, on both sides of which an active substance is applied, a negative electrode plate having a negative electrode foil, on both sides of which the active substance is applied, and a separator interposed between these electrode plates, and is obtained by winding the above parts. The negative electrode foil is electrically connected directly to a bottom of the outer packaging can so that heat generated in an interior of the electric double layer capacitor is efficiently transferred to the outer packaging can from the negative electrode foil. The negative electrode foil has a greater thickness than that of the positive electrode foil, which is not electrically connected to the outer packaging can, so that heat quantity transferred is made large.

3 Claims, 15 Drawing Sheets

ELECTRIC DOUBLE LAYER CAPACITOR

This application is a divisional of application Ser. No. 09/643,975, filed Aug. 22, 2002 now U.S. Pat. No. 6,456,484, which application(s) are incorporated herein by reference.

BACKGROUND OF THE INVENTION

1. Field of the Invention

The present invention relates to an electric double layer capacitor in which electric double layers are formed at interfaces between electrodes and an electrolyte and electricity is stored in the electric double layers.

2. Description of the Related Art

An electric double layer capacitor is an electricity charging and discharging element. An example of such an electric double layer capacitor is disclosed in, for example, Japanese Patent Laid-Open Publication No. HEI-10-294102 entitled "Electricity Storing Element".

The disclosed electric double layer capacitor comprises an electrode rolled body formed by overlapping a positive electrode plate, a negative electrode plate and a separator interposed therebetween to wind the same in a rolled manner. A lower end of the negative electrode plate is connected electrically to a negative collecting plate, which serves as a negative electrode terminal. An upper end of the positive electrode plate is connected electrically to a positive collecting plate, which serves as a positive electrode terminal. After the electrode rolled body in such a state is contained in a bottomed, cylindrical-shaped outer packaging can and an electrolyte is poured into the outer packaging can, the outer packaging can is closed by a cover. The positive collecting plate is electrically connected to the cover. The negative collecting plate is electrically connected to the outer packaging can.

With the above-mentioned electric double layer capacitor, heat generated due to electric resistance generated from the electrode rolled body and the like at the time of, for example, charging heats the electrolyte. Accordingly, to maintain the service life of an electric double layer capacitor over a long term, it is necessary to discharge the generated heat to the atmosphere. FIG. 15 hereof shows a schematic constitution, in which heat of the above-mentioned electric double layer capacitor is discharged.

In FIG. 15, an electric double layer capacitor 500 is constructed such that a negative collecting plate 505 is interposed between a negative electrode plate 502 of an electrode rolled body 501 and a bottom 504 of an outer packaging can 503 to electrically connect the negative electrode plate 502 and the negative collecting plate 505 to each other to connect the negative collecting plate 505 electrically to the bottom 504 of the outer packaging can 503.

The electric double layer capacitor 500 comprises a first connection 506, which electrically connects the negative electrode plate 502 and the negative collecting plate 505 to each other, and a second connection 507, which electrically connects the negative collecting plate 505 and the bottom 504 of the outer packaging can 503 to each other. Therefore, heat generated in the electric double layer capacitor 500 is discharged to the atmosphere from the outer packaging can through the first connection 506 and the second connection 507.

However, because the first connection 506 and the second connection 507 are small in area, heat quantity transferred through the first connection 506 and the second connection 507 becomes small. Therefore, heat transfer quantity generated in the electric double layer capacitor 500 is held down by the first connection 506 and the second connection 507, which is responsible for temperature rise in the electric double layer capacitor 500 to affect the service life thereof.

Further, with the electric double layer capacitor disclosed in Japanese Patent Laid-Open Publication No. HEI-10-294102, the positive collecting plate covers an upper end of the positive electrode plate, and so it acts as an obstacle when an electrolyte is filled into the electrode rolled body. Therefore, it takes time to fill the electrolyte into the electrode rolled body.

Japanese Patent Laid-Open Publication No. HEI-10-294102 further discloses a positive collecting plate having slits formed on both sides of radially extending convex ridges. Such a positive collecting plate will be described with reference to FIG. 16 hereof.

FIG. 16 shows, in an enlarged scale, a part of the positive collecting plate having the slits formed on both sides of the convex ridges. The convex ridges 601 of the positive collecting plate 600 are used to bend an upper end 604 of a positive electrode plate 603 in an electrode rolled body 602, and the convex ridges 601 are welded to bent portions 605 of the upper end 604.

Because the positive collecting plate 600 has slits 606, 606 on both sides of the convex ridges 601, it is possible to fill an electrolyte into the electrode rolled body 602 through the slits 606, 606.

Since both ends 605a of the bent portions 605 of the positive electrode plate 603 extend to the slits 606, 606, however, a part of the slits 606, 606 is closed by the both ends 605a of the bent portions 605. Therefore, when an electrolyte is filled into the electrode rolled body 602 from the slits 606, 606, the both ends 605a of the bent portions 605 act as an obstacle, and so it is difficult to efficiently fill the electrolyte from the slits 606, 606.

Further, with the electric double layer capacitor disclosed in the above-mentioned Japanese Patent Laid-Open Publication No. HEI-10-294102, a leaf-spring shaped pressing member is mounted on a side of the cover in order to electrically connect the cover to the positive collecting plate, and the pressing member is brought into electrical contact with a central projection of the positive collecting plate. However, the pressing member contacts locally with the projection, and so the contact area therebetween is small. Therefore, electric current flowing in local contact portions between the pressing member and the projection is restricted.

To flow large electric current at contact portions is important in improving the performance of an electric double layer capacitor.

Hereupon, FIG. 17 shows a conventional electric double 4. layer capacitor capable of flowing a relatively large electric current.

Referring to FIG. 17, an electric double layer capacitor 700 is constructed such that an outer packaging can 707 contains therein an electrode rolled body 701 in a state, in which a negative collecting plate 704 is electrically connected to a lower end of a negative electrode plate 702 of the electrode rolled body 701 and a positive collecting plate 705 is electrically connected to an upper end of a positive electrode plate 703. The negative collecting plate 704 is connected electrically to a bottom 708 of an outer packaging can 707. The positive collecting plate 705 is electrically connected to a cover 709. The outer packaging can 707 is filled with an electrolyte.

The positive collecting plate 705 is formed centrally with an upwardly extending projection 706. The projection 706 is inserted into a hole 709a formed in the cover 709. The projection 706 is welded to the cover 709. The projection 706 is formed to have a relatively large diameter to be large in cross sectional area. Therefore, a relatively large electric current can be made to flow to the projection 706 to improve the performance of the electric double layer capacitor 700.

It is necessary to reduce the electrode rolled body 701 in manufacturing error because it is required that a reference dimension H1 from the bottom 708 of the outer packaging can 707, which serves as a negative electrode, to a tip end 706a of the projection 706, which serves as a positive electrode, to be uniform. Therefore, a height hl of the electrode rolled body must be kept uniform by decreasing the electrode rolled body 701 in manufacturing error.

However, the electrode rolled body 701 shown in FIG. 17 is constructed by overlapping and winding the positive electrode plate, negative electrode plate and a separator in a rolled manner, and so displacement upon winding to generate manufacturing error is liable to occur. Therefore, to reduce the electrode rolled body 701 in manufacturing error to keep the height hl of the electrode rolled body 701 uniform, an installation of high accuracy is necessary and it is difficult to hold down cost of an electric double layer capacitor due to the increased installation cost.

SUMMARY OF THE INVENTION

It is a first object of the present invention to provide an electric double layer capacitor capable of efficiently discharging heat generated in an interior thereof.

It is a second object of the invention to provide an electric double layer capacitor enabling efficiently filling an electrolyte into an interior of an electrode rolled body of the electric double layer capacitor.

It is a third object of the invention to hold down cost of an electric double layer capacitor.

In a first aspect of the present invention, there is provided an electric double layer capacitor having an outer packaging can containing therein an electrode rolled body obtained by interposing a separator between a pair of a positive electrode plate having a positive electrode foil, on both sides of which an active substance is applied, and a negative electrode plate having a negative electrode foil, on both sides of which the active substance is applied, and winding them, characterized in that the negative electrode foil is electrically connected directly to a bottom of the outer packaging can, and the negative electrode foil has a greater thickness than that of the positive electrode foil, which is not electrically connected to the outer packaging can.

In this manner, in the first aspect of the invention, the negative electrode foil is electrically connected directly to the bottom of the outer packaging can, so that locations of electric connection in a heat conductive path can be reduced to thereby provide an increase in heat transfer quantity. Accordingly, heat generated in the electric double layer capacitor can be efficiently transferred to the bottom of the outer packaging can from the negative electrode foil, and so heat generated in the electric double layer capacitor is efficiently discharged to the atmosphere. And the electric double layer capacitor is extended in service life.

Further, in the invention, the negative electrode foil connected to the bottom of the outer packaging can has a greater thickness than that of the positive electrode foil. Therefore, the negative electrode foil can be increased in cross sectional area to increase heat transfer quantity, so that heat in the electric double layer capacitor can be efficiently transferred to the bottom of the outer packaging can. Besides, the negative electrode foil is increased in thickness to be enhanced in rigidity, so that the electric double layer capacitor is improved in vibration-proof quality. Further, only the negative electrode foil is made thick and the positive electrode foil is made thin. Whereby the electrode rolled body is not made large, and so the electric double layer capacitor does not become large-sized.

In a second aspect of the present invention, there is provided an electric double layer capacitor having an electrode rolled body obtained by overlapping and winding a pair of electrode plates, which serve as positive and negative electrodes, and positive and negative collecting plates, which are mounted to edges of the electrode rolled body and through which charging is effected on the electrode plates and discharging is effected from the electrode plates, characterized in that at least the positive collecting plate of the collecting plates includes a plurality of convex ridges extending radially from central portions thereof and projecting toward the electrode rolled body, and openings or notches formed to be positioned between adjacent convex ridges, and that the convex ridges are pressed against the electrode rolled body to form bent portions on upper and lower ends of the electrode plates, and the convex ridges are joined to the bent portions by welding to permit an electrolyte to be filled into the electrode rolled body through the openings or notches.

In this manner, in the second aspect of the invention, a plurality of the convex ridges are formed on the collecting plates, and the openings or notches are formed to be positioned between adjacent convex ridges. Accordingly, the convex ridges are pressed to form the bent portions on the upper and lower ends of the electrode plates, and the convex ridges are joined to the bent portions by welding to thereby enabling separating the openings or notches from the bent portions. Therefore, when an electrolyte is filled into the electrode rolled body from the openings or notches, the bent portions do not interfere with filling of the electrolyte and the electrolyte is rapidly filled.

In a third aspect of the present invention, there is provided an electric double layer capacitor comprising: an electrode rolled body formed by overlapping one of electrode plates on the other of electrode plates and winding the same in a rolled manner; a bottomed, cylindrical-shaped outer packaging can containing therein the electrode rolled body and connected electrically to one end of the one of electrode plates; a collecting plate connected electrically to the other of electrode plates of the electrode rolled body contained in the outer packaging can; and a cover covering the outer packaging can; and wherein the cover is formed centrally thereof with a hole, from which a cylindrical portion is extended outside, and a projection formed centrally of the collecting plate is inserted into the cylindrical portion to an extent not to project from the cylindrical portion, and wherein the cylindrical portion and the projection are welded and sealed at a weld on an inner peripheral surface of the cylindrical portion.

In this manner, in the third aspect of the invention, the cylindrical portion is mounted to the cover, and the projection is formed on the collecting plate to be capable of being inserted into the cylindrical portion. Therefore, even when a relatively large manufacturing error is produced on the electrode rolled body, the manufacturing error of the electrode rolled body can be accommodated by moving the projection in that range, in which the projection will not project from the cylindrical portion, so that it is possible with a simple constitution to keep a reference dimension of the electric double layer capacitor uniform. Accordingly, when the electrode rolled body is wound, manufacturing error is allowable to some extent, and so it is possible to hold down cost of an electric double layer capacitor.

BRIEF DESCRIPTION OF THE DRAWINGS

Certain preferred embodiments of the present invention will be described in details hereinbelow, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
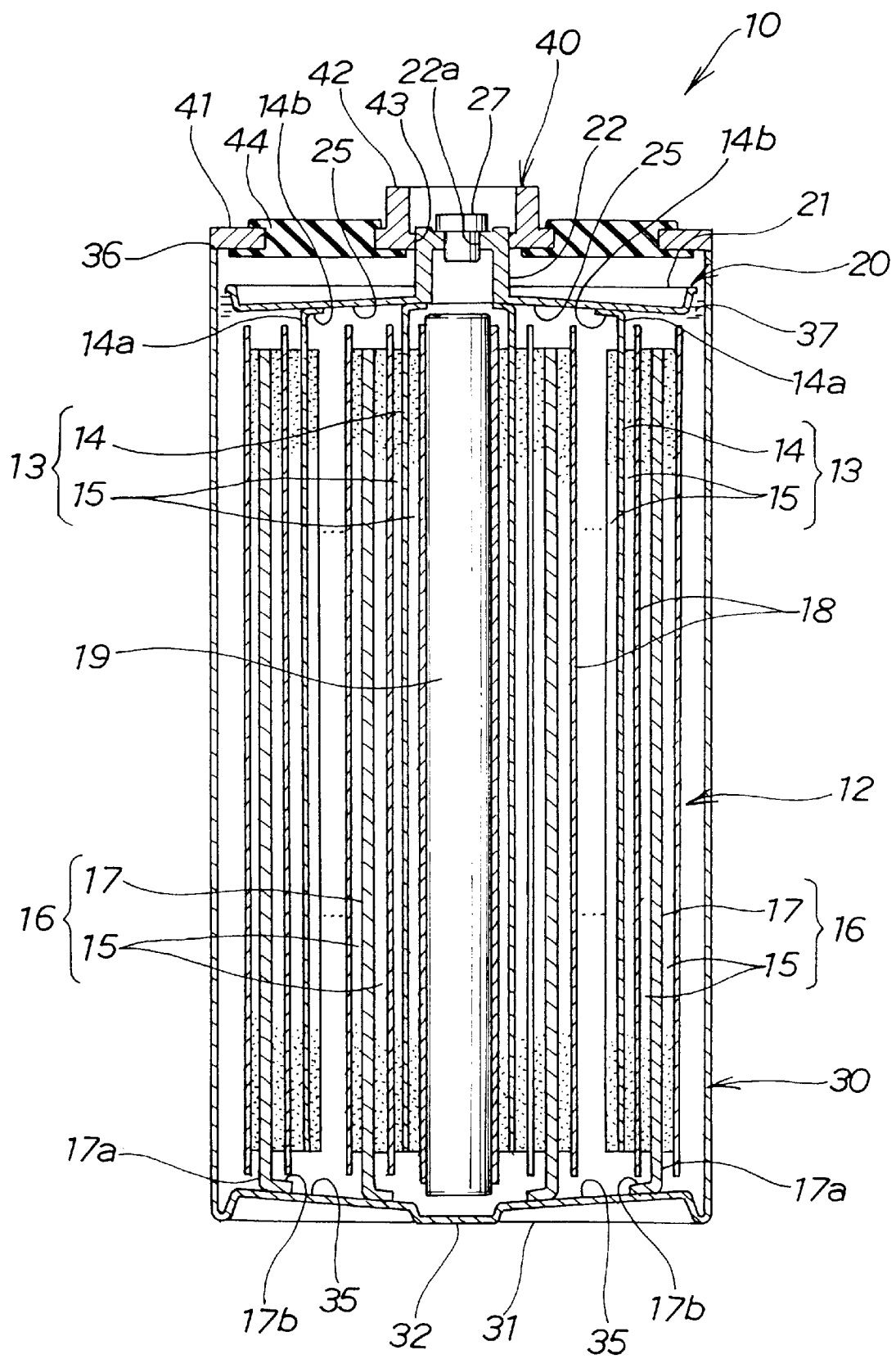
FIG. 1 is a cross sectional view showing an electric double layer capacitor according to a first embodiment of the invention.

In FIG. 1, an electric double layer capacitor 10 comprises an electrode rolled body 12 for storing electricity, a collecting plate 20 connected electrically to a positive electrode plate 13 of an electrode rolled body 12, a bottomed, cylindrical-shaped outer packaging can 30, which contains the electrode rolled body 12 thus connected and is connected electrically to a negative electrode plate 16, an electrolyte 37 filled in the outer packaging can 30, and a cover 40 closing the outer packaging can 30.

The electrode rolled body 12 is constructed such that the positive electrode plate 13 and the negative electrode plate 16 overlap one another with a separator 18 interposed therebetween and are rolled round a roll core 19 in a rolled fashion.

The positive electrode plate 13 comprises a belt-shaped positive electrode foil 14, and an active substance 15, 15 applied to both sides of the positive electrode foil 14 except a positive electrode foil upper end 14a of the positive electrode foil 14. The positive electrode foil upper end 14a projects above the electrode rolled body 12. The positive electrode foil upper end 14a is bent inward to be connected electrically to the collecting plate 20. The positive electrode foil 14 is, for example, an aluminum foil or stainless steel foil, and the active substance 15 is, for example, activated carbon.

The negative electrode plate 16 comprises a belt-shaped negative electrode foil 17, and an activated carbon 15, 15 applied to both sides of the negative electrode foil 17 except a negative electrode foil lower end 17a of the negative electrode foil 17. The negative electrode foil lower end 17a projects below the electrode rolled body 12. The negative electrode foil lower end 17a is bent inward to be connected electrically to a bottom 31 of the outer packaging can 30.

The negative electrode foil 17 is of an aluminum foil or stainless steel foil having a greater thickness than that of the positive electrode foil 14. The negative electrode foil 17 is set to have a thickness that permits heat generated in the electric double layer capacitor 10 to be efficiently discharged to the atmosphere and can endure when the electric double layer capacitor 10 oscillates and that makes the electrode rolled body 12 compact.

The separator 18 is an insulating paper that is interposed between the positive electrode plate 13 and the negative electrode plate 16 to provide insulation between the positive electrode plate 13 and the negative electrode plate 16 and is formed with small holes so as not to interfere with flow of ions.

The collecting plate 20 is constructed such that an upwardly extending projection 22 is formed centrally of a disk 21 and a plurality of convex ridges 25 extend radially toward an outer periphery of the disk 21 from the projection 22. The projection 22 has an opening 22a. The opening 22a mounts thereon a safety valve 27.

The convex ridges 25 are tapered such that they increase in height toward the outer periphery of the disk 21 from a center thereof. Therefore, pressing the collecting plate 20 against the positive electrode foil upper end 14a of the positive electrode plate 13 can cause the convex ridges 25 to bend the positive electrode foil upper end 14a of the positive electrode plate 13 inward. Accordingly, a bent portion 14b of the positive electrode foil upper end 14a thus bent inward is connected electrically to the convex ridges 25 of the collecting plate 20.

The outer packaging can 30 is formed of an electrically conductive material to be in the form of a bottomed cylinder The bottom 31 of the outer packaging can 30 is provided centrally thereof with a projection 32. A plurality of convex ridges 35 extend radially toward an outer periphery of the bottom 31 from the projection 32.

The convex ridges 35 are tapered such that they increase in height toward the outer periphery of the bottom 31 from the projection 32 formed on the bottom 31. Therefore, pressing the bottom 31 of the outer packaging can 30 against the negative electrode foil lower end 17a of the negative electrode plate 16 can cause the convex ridges 35 to bend the negative electrode foil lower end 17a inward. A bent portion 17b of the negative electrode foil lower end 17a thus bent inward is connected electrically to the convex ridges 35 of the bottom 31.

The cover 40 comprises an outer ring 41 and a central cylindrical portion 42, each of which is formed of an electrically conductive material and both of which are joined by an insulating ring 44. The ring 41 is welded to an opening 36 of the outer packaging can 30 to close the outer packaging can 30. In this manner, the cover 40 is more rigidly mounted to the outer packaging can 30 by welding the ring 41 to the opening 36 of the outer packaging can 30 than by mounting with caulking.

The projection 22 of the collecting plate 20 is inserted into an opening 43 of the cylindrical portion 42. The projection 22 and an inner peripheral surface of the cylindrical portion 42 is joined by welding.

Figure 2:
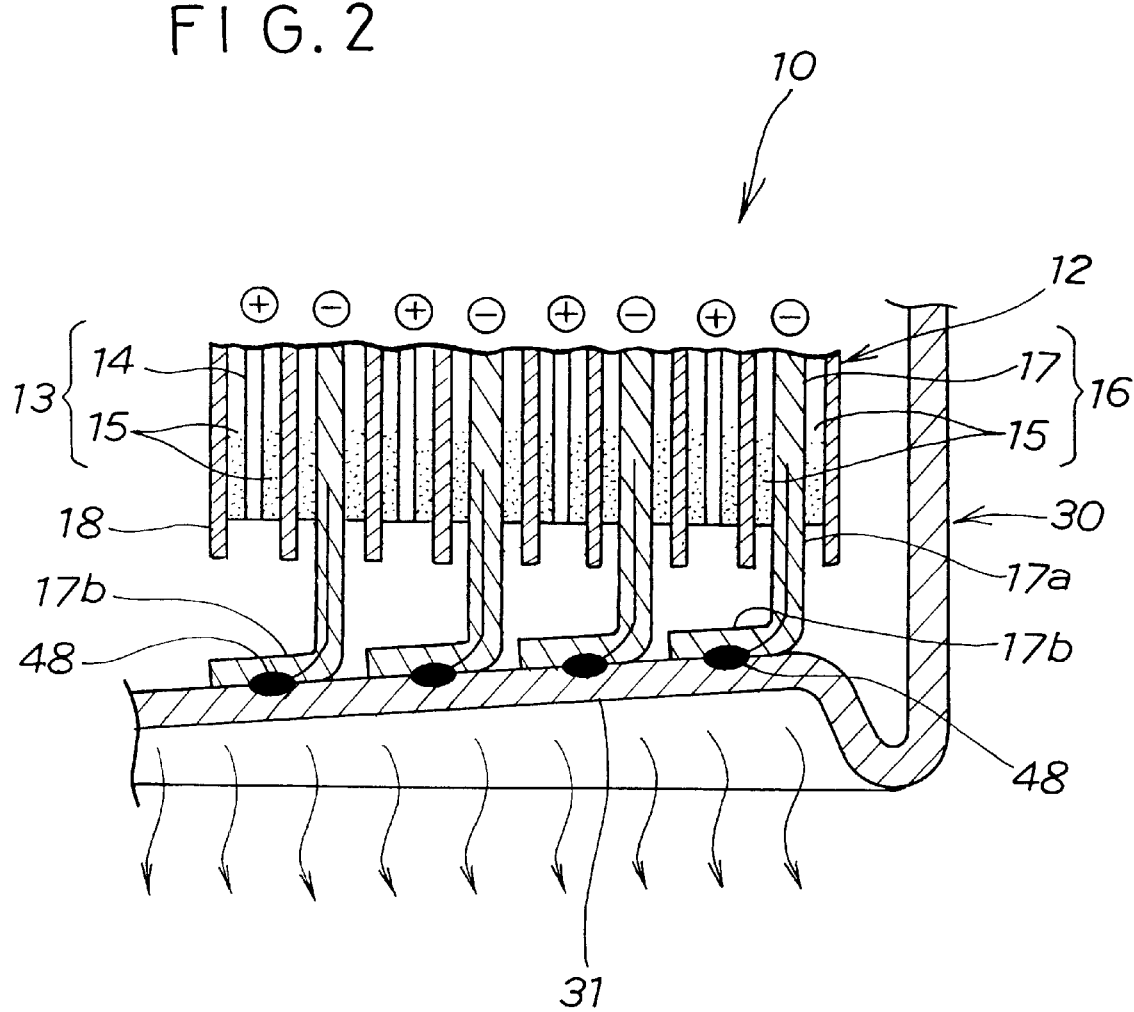
FIG. 2 is a view illustrating an action of the electric double layer capacitor shown in FIG. 1.

As shown in FIG. 2, the negative electrode foil lower end 17a of the negative electrode foil 17 is connected directly to the bottom 31 of the outer packaging can 30. Therefore, locations of connection in a heat conductive path comprises only a connection s48 between the negative electrode foil s17 and the bottom 31 of the outer packaging can 30. That is, because the negative electrode foil is not connected to the outer packaging can through any negative collecting plate as in the prior art, locations of connection can be less than in the prior art.

Generally, connections are small in area and so small in heat transfer quantity. Therefore, locations of connection in a heat conductive path are reduced to thereby provide an increase in heat transfer quantity, so that heat generated in the electric double layer capacitor 10 can be efficiently transferred to the bottom 31 of the outer packaging can 30 from the negative electrode foil lower end 17a of the negative electrode foil 17. Accordingly, heat generated in the electric double layer capacitor 10 is efficiently discharged to the atmosphere as indicated by arrows.

Further, the negative electrode foil 17 connected to the bottom 31 of the outer packaging can 30 is made thicker than the positive electrode foil 14 not electrically connected to the outer packaging can 30. Since heat transfer quantity is in proportion to cross sectional area, heat transfer quantity can be increased by an amount the negative electrode foil 17 is increased in cross sectional area. Accordingly, heat generated in the electric double layer capacitor 10 is efficiently transferred to the bottom 31 of the outer packaging can 30 by the negative electrode foil 17 to be discharged to the atmosphere.

In this manner, reduction in locations of connection in a heat conductive path and thickening of the negative electrode foil 17 make It possible to prevent heat from accumulating in an interior of the electric double layer capacitor 10 to extend the service life of the electric double layer capacitor 10.

In the case where the electric double layer capacitor 10 is loaded on a vehicle, vibrations of the vehicle are transmitted to the electric double layer capacitor 10, and so the vibration-proof quality is required of the electric double layer capacitor to enable the same adequately enduring vibrations of the vehicle. Hereupon, the electric double layer capacitor 10 according to the embodiment is designed to thicken the negative electrode foil 17 connected to the bottom 31 of the outer packaging can 30. Therefore, the negative electrode foil 17 can be increased in rigidity, so that it becomes possible to improve the vibration-proof quality of the electric double layer capacitor 10.

In the case where the electric double layer capacitor 10 is loaded on a vehicle, it is necessary to arrange the electric double layer capacitor 10 in a limited location. Therefore, the electric double layer capacitor 10 is required to be small in size. Hereupon, only the negative electrode foil 17 connected to the bottom 31 of the outer packaging can 30 is thickened and the positive electrode foil 14 is made thin. Therefore, large sizing of the electrode rolled body 12 is suppressed as much as possible.

Further, while an explanation has been given to an example, in which the negative electrode foil lower end 17a of the negative electrode foil 17 Is bent inward to be connected directly to the bottom 31 of the outer packaging can 30, the negative electrode foil lower end 17a of the negative electrode foil 17 may be connected electrically to the bottom 31 of the outer packaging can 30 without being bent.

Figure 3:
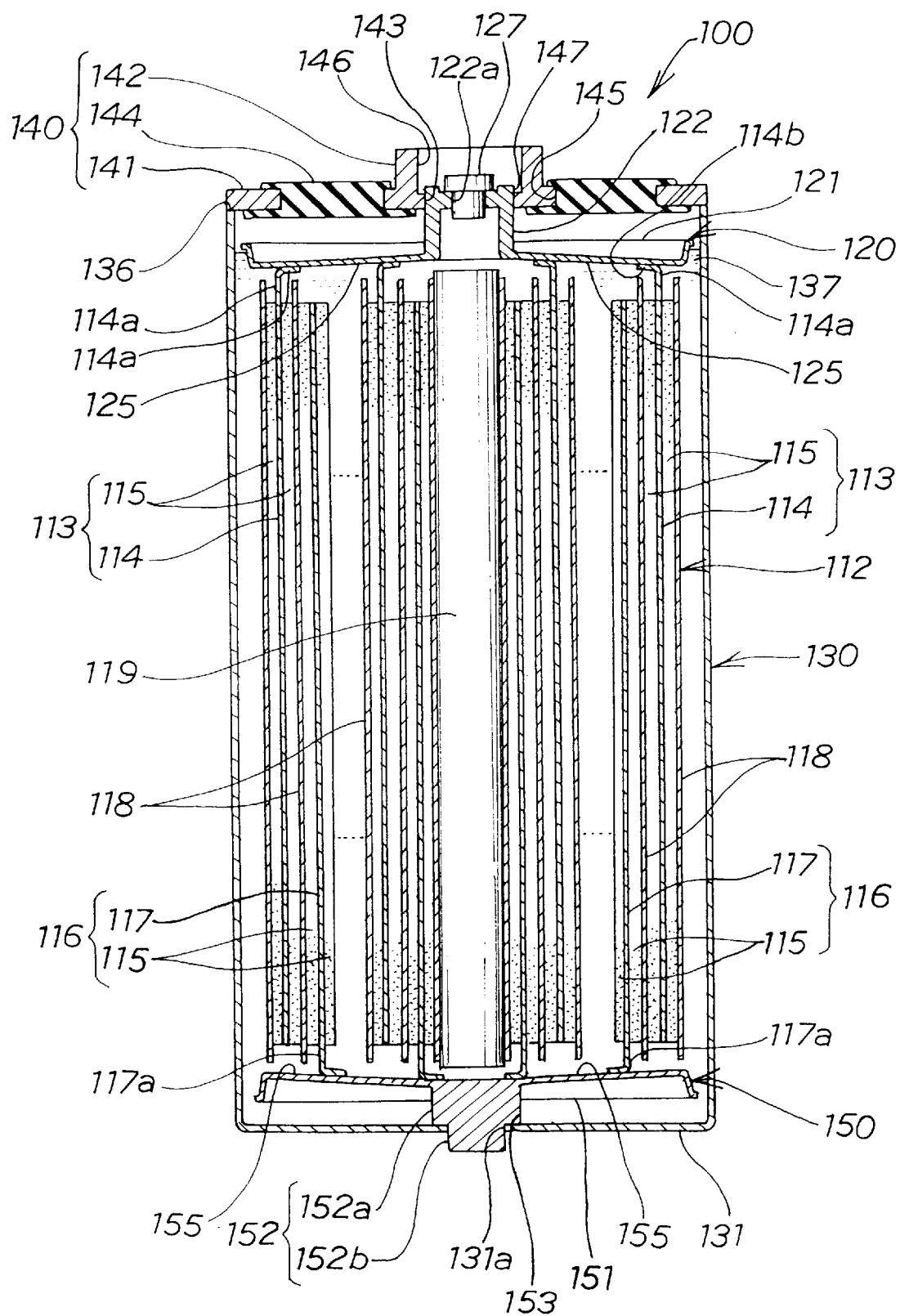
FIG. 3 is a cross sectional view showing an electric double layer capacitor according to a second embodiment of the invention.

FIG. 3 is a cross sectional view showing an electric double layer capacitor according to a second embodiment of the invention.

In FIG. 3, an electric double layer capacitor 100 comprises an electrode rolled body 112 for storing electricity, a collecting plate (positive collecting plate) 120 connected electrically to one of electrode plates (positive electrode plates) 113 of an electrode rolled body 112, a collecting plate (negative collecting plate) 150 connected electrically to the other of the electrode plates (negative electrode plate) 116 of an electrode rolled body 112, a bottomed, cylindrical-shaped outer packaging can 130, which contains the electrode rolled body 112, an electrolyte 37 filled in the outer packaging can 130, and a cover 140 closing the outer packaging can 130.

The electrode rolled body 112 is constructed such that the positive electrode plate 113 and the negative electrode plate 116 overlap one another with a separator 118 interposed therebetween and are rolled round a roll core 119 in a rolled fashion.

The positive electrode plate 113 comprises a belt-shaped positive electrode foil 114, and an activated carbon 115, 115 applied to both sides of the positive electrode foil 114 except a positive electrode foil upper end 114a of the positive electrode foil 114. The positive electrode foil upper end 114a of the positive electrode foil 114 projects above the electrode rolled body 112. The positive electrode foil upper end 114a is bent inward to be connected electrically to the positive collecting plate 120. The positive electrode foil 114 is, for example, an aluminum foil or stainless steel foil.

The negative electrode plate 116 comprises a belt-shaped negative electrode foil 117, and an activated carbon 115, 115 applied to both sides of the negative electrode foil 117 except a negative electrode foil lower end 117a of the negative electrode foil 117. The negative electrode foil lower end 117a of the negative electrode foil 117 projects below the electrode rolled body 112. The negative electrode foil lower end 117a is bent inward to be connected electrically to the negative collecting plate 150. The negative electrode foil 117 is, for example, an aluminum foil or stainless steel foil.

The separator 118 is an insulating paper that is interposed between the positive electrode plate 113 and the negative electrode plate 116 to provide insulation between the positive electrode plate 113 and the negative electrode plate 116.

The negative collecting plate 150 is constructed such that an downwardly extending projection 152 is formed centrally of a disk 151 and a plurality of convex ridges 155 extend radially toward an outer periphery of the disk 151 from the projection 152.

The projection 152 is constructed such that a large diameter portion 152a is formed centrally of the disk 151 to extend downward and a small diameter portion 152b is formed to extend further downward from the large diameter portion 152a to form a step 153.

The convex ridges 155 are tapered such that they increase in height toward the outer periphery of the disk 151 from a center thereof. Therefore, pressing the negative collecting plate 150 against the negative electrode foil lower end 117a of the negative electrode plate 116 can cause the convex ridges 155 to bend the negative electrode foil lower end 117a of the negative electrode plate 116 inward. Therefore, a contact area between the convex ridges 155 and the negative electrode plate 116 becomes large to allow flow of a large amount of electric current therethrough.

The positive collecting plate 120 is constructed such that a projection 122 is formed centrally of a disk 121 and a plurality of convex ridges 125 extend radially toward an outer periphery of the disk 121 from the projection 122. Like the convex ridges 155 of the negative collecting plate 150, the respective convex ridges 125 are tapered to be increased in height toward the outer periphery of the disk 121 from a center thereof. Therefore, pressing the convex ridges 125 against the positive electrode foil upper end 114a of the positive electrode plate 113 can cause the positive electrode foil upper end 114a to be bent inward. Therefore, like the negative electrode plate 116, a contact area between the convex ridges 125 and the positive electrode plate 113 becomes large to allow flow of a large amount of electric current therethrough.

The projection 122 has an opening 122a, and a safety valve 127 is mounted on the opening 122a.

The outer packaging can 130 is a storage casing formed of an electrically conductive material in the form of a bottomed cylinder. The outer packaging can 130 is formed at a center of a bottom 131 thereof with an opening 131a. An opening 136 is formed on an upper portion opposite to the bottom 131. The small diameter portion 152b of the projection 152 on the negative collecting plate 150 is inserted into the opening 131a whereby the step 153 of the projection 152 can be brought into contact with the bottom 131 of the outer packaging can 130. Thus a contact area between the bottom 131 and the negative collecting plate 150 becomes large to allow flow of a large amount of electric current.

The cover 140 comprises an outer ring 141 and a central cylindrical portion 142, each of which is formed of an electrically conductive material and both of which are joined by an insulating ring 144. The ring 141 is welded to an opening 136 of the outer packaging can 130 to close the outer packaging can 130. In this manner, the cover 140 can be more rigidly mounted to the outer packaging can 130 by welding the ring 141 to the outer packaging can 130 than by mounting with caulking.

The cylindrical portion 142 extends upward above a hole 145 formed centrally of the cover 140. The projection 122 of the positive collecting plate 120 is inserted into an insertion port 143 of the cylindrical portion 142 to be welded to an inner peripheral surface 146 of the cylindrical portion 142 at a weld 147. At this time, the projection 122 on the positive collecting plate 120 is inserted into the insertion port 143 to such an extent that the projection 122 is not projected above an upper end of the cylindrical portion 142, and welding is carried out as described above to seal the electric double layer capacitor 100. The cylindrical portion 142 accommodates the manufacturing error of the electrode rolled body 112 and makes the same adjustable by sliding the projection 122 in the Insertion port 143 up and down. The relationship between the cylindrical portion 142 and the projection 122 will be described in details with reference to FIGS. 12 to 14.

Figure 4:
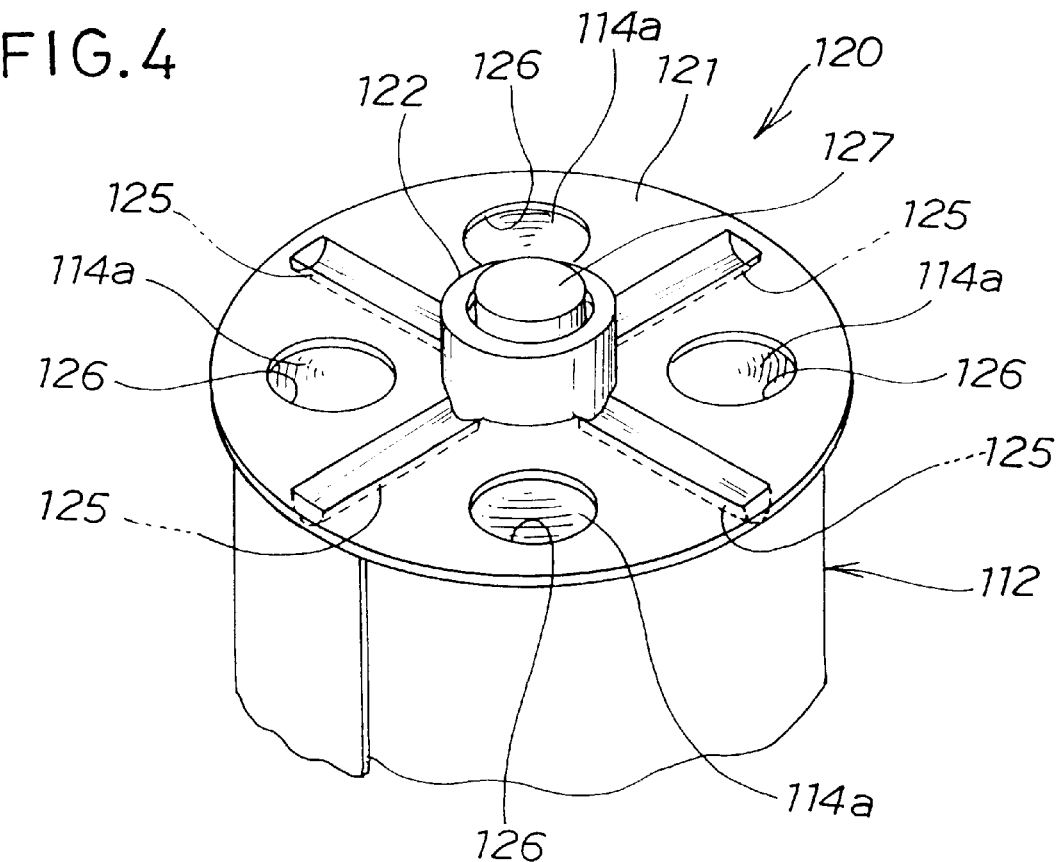
FIG. 4 is a perspective view showing the relationship between an electrode rolled body and a positive collecting plate shown in FIG. 3.

In FIG. 4, the positive collecting plate 120 has the projection 122 centrally of the disk 121. The positive collecting plate 120 has a plurality of the convex ridges 125 extending radially from the projection 122. The convex ridges 125 extend downward to be directed toward an upper end of the electrode rolled body 112. Openings 126 are respectively formed between adjacent convex ridges 125.

The convex ridges 125 are pressed against the positive electrode foil upper end 114a of the positive electrode plate 113 (see FIG. 3) whereby bent portions 114b (see FIG. 3) are formed on the positive electrode foil upper end 114a of the positive electrode plate 113 only at locations corresponding to the convex ridges 125. Therefore, the openings 126 can be arranged in positions where the positive electrode foil upper end 114a of the positive electrode plate 113 is not bent.

Figure 5:
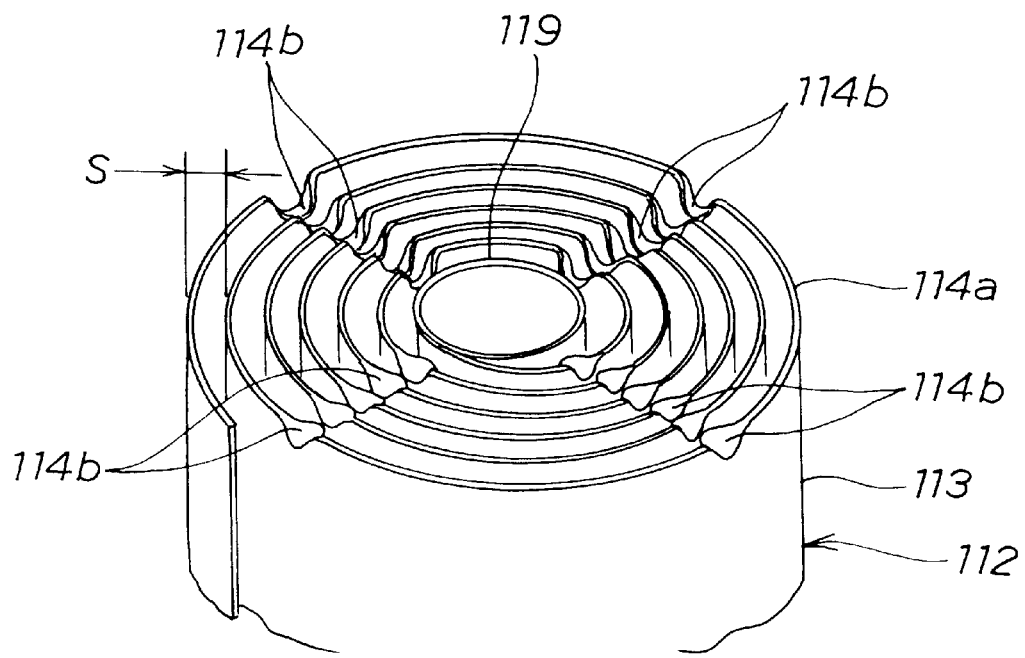
FIG. 5 is a perspective view showing a part of the electrode rolled body shown in FIG. 3.

FIG. 5 shows the electrode rolled body 112 in a state, in which the bent portions 114b are formed on the positive electrode foil upper end 114a of the positive electrode plate 113.

In this manner, since the bent portions 114b are formed at locations corresponding to the convex ridges 125 shown in FIG. 4, it is possible to provide spaces between the positive electrode foil upper end 114a and the positive electrode foil upper end 114a in regions except the bent portions 114b. Therefore, the openings 126 shown in FIG. 4 are disposed above the spaces to permit the electrolyte to be easily poured into the electrode rolled body 112 through the spaces from the openings 126.

Figure 6:
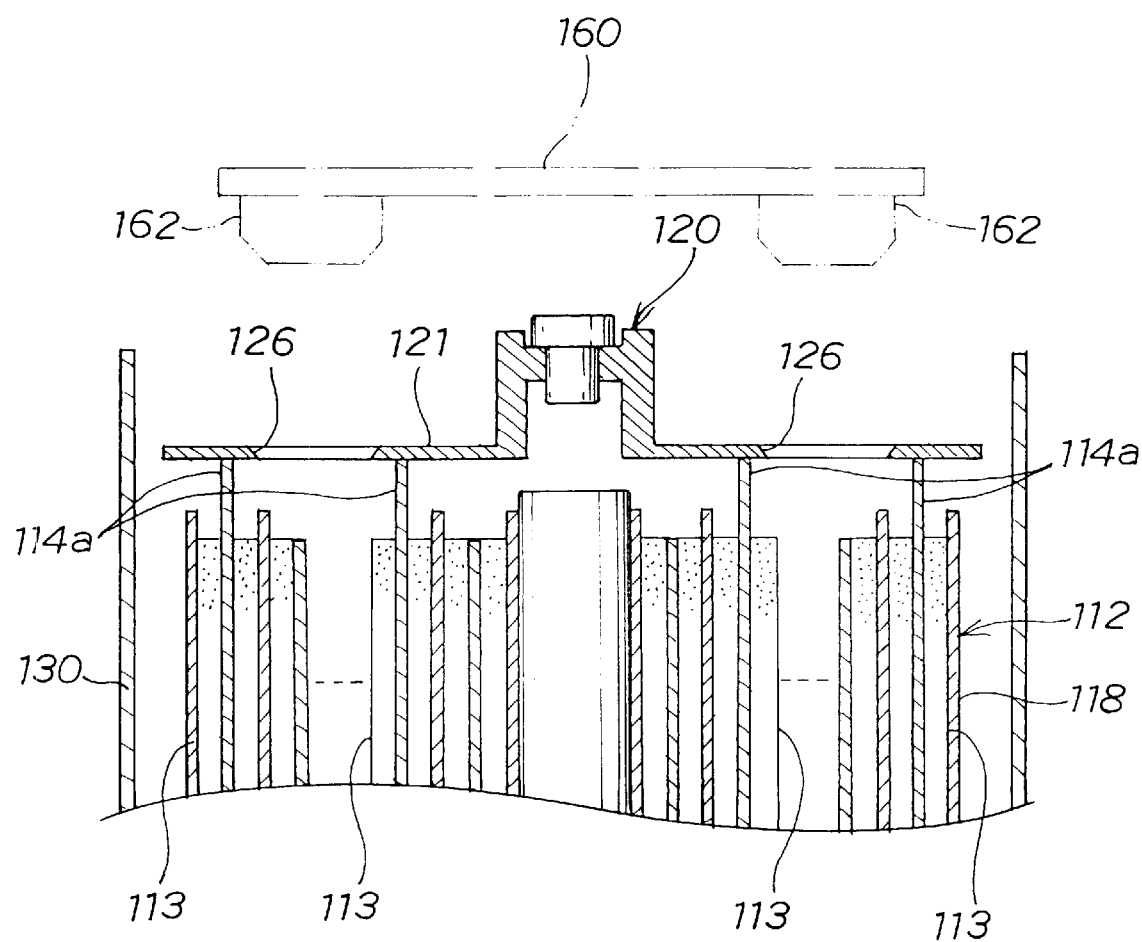
FIG. 6 is an enlarged cross sectional view showing a part shown In FIG. 4.

FIG. 6 shows a state, in which the positive collecting plate 120 is placed on the positive electrode foil upper end 114a of the positive electrode plate 113.

A plurality of the openings 126 formed on the positive collecting plate 120 are formed to be tapered such that their diameter on a front side of the disk 121 is larger than that on a rear side thereof. Therefore, pins 162, 162 on a positioning jig 160 shown by two-dot chain line are easily inserted into the respective openings 126 to position the positive collecting plate 120 in a normal position.

How to mount the positive collecting plate on the electrode rolled body will be described below with reference to FIGS. 7A to 7F.

Figure 7A:
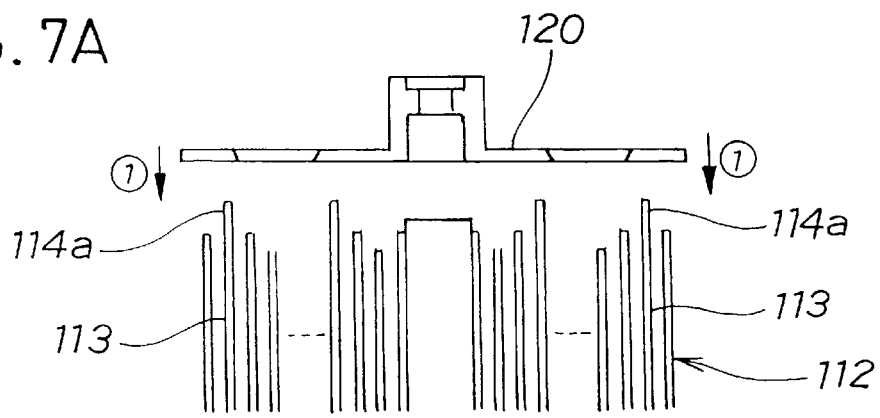
FIGS. 7A to 7F are views illustrating the order of mounting of the electrode rolled body and the positive collecting plate in the second embodiment.

In FIG. 7A, the positive collecting plate 120 is placed on an upper end of the electrode rolled body 112, that is, the positive electrode foil upper end 114a of the positive electrode plate 113, as shown by arrows ①.

Figure 7B:
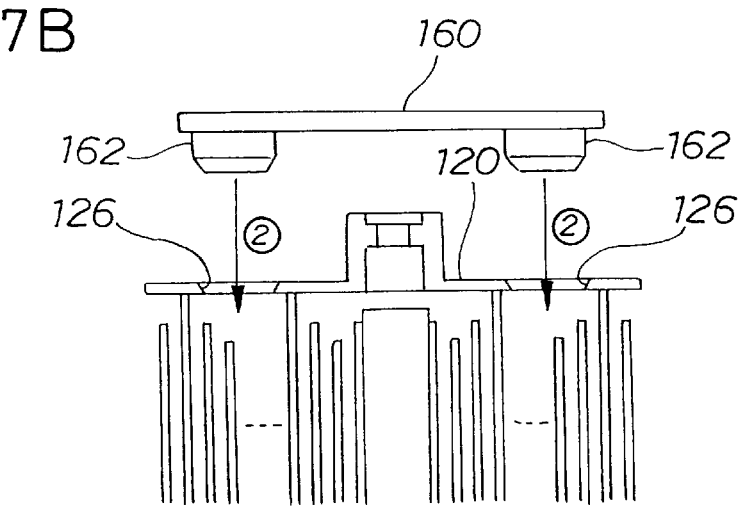

In FIG. 7B, the pins 162, 162 of the positioning jig 160 are inserted into the openings 126, 126, as shown by arrows ②. Since the openings 126, 126 are formed to be tapered as described above, the pins 162, 162 are smoothly inserted into the openings 126, 126.

Figure 7C:
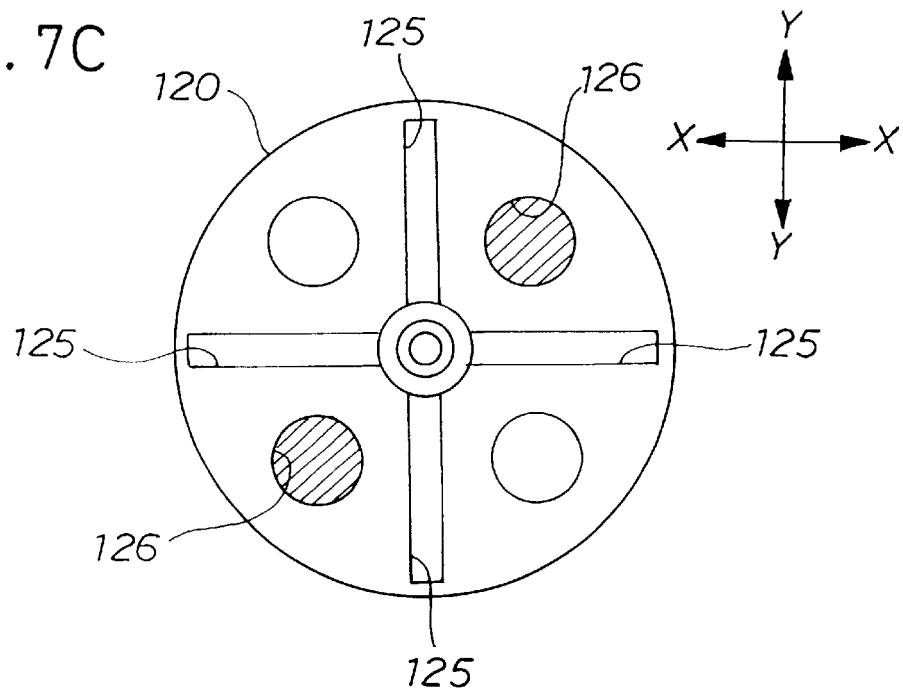

In FIG. 7C, the pins 162, 162 of the positioning jig 160 shown in FIG. 7B are fitted into the openings 126, 126 shown by hatch, among the openings 126, 126 in the positive collecting plate 120, whereby the positive collecting plate 120 can be positioned in a normal position, that is, in a position where the convex ridges 125 on the positive collecting plate 120 are made to correctly register with X-axis and Y-axis.

Figure 7D:
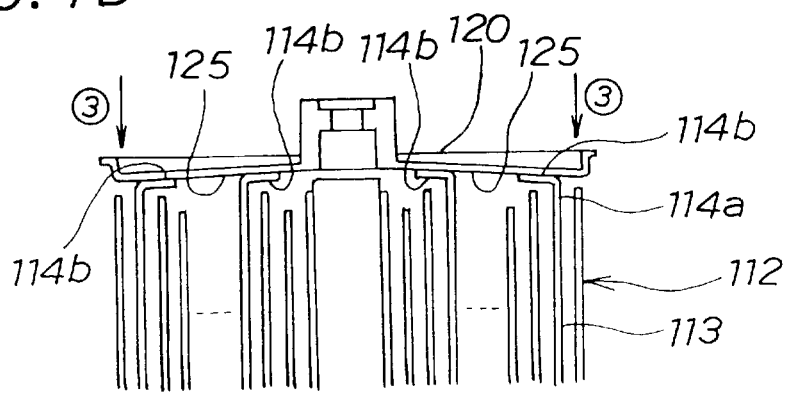

In FIG. 7D, the convex ridges 125 on the positive collecting plate 120 are pressed against the positive electrode foil upper end 114a of the positive electrode plate 113 as shown by arrows ③ to bend the positive electrode foil upper end 114a inward to form the bent portions 114b.

Figure 7E:
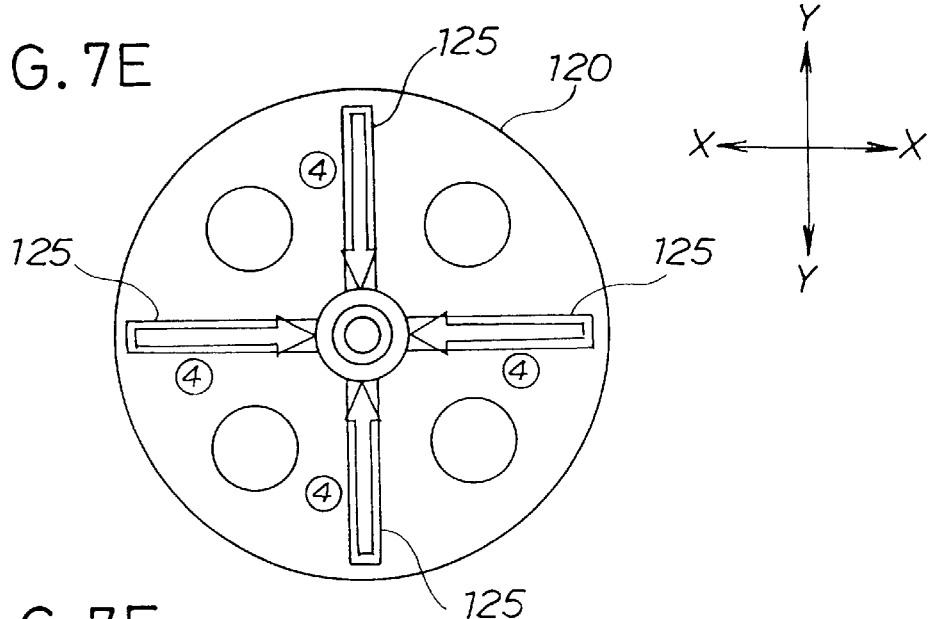
Figure 7F:
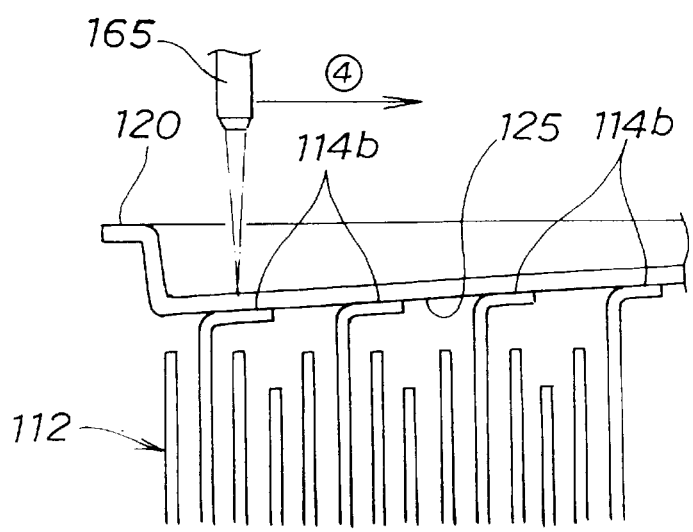

In FIG. 7E, for example, an electron beam welding apparatus 165 (see FIG. 7F) is used to weld the convex ridges 125 to the bent portions 114b shown in FIG. 7D. Here, the convex ridges 125 on the positive collecting plate 120 are positioned on X-axis and Y-axis as shown in FIG. 7C. Accordingly, the electron beam welding apparatus 165 is moved along the X-axis and Y-axis, and hence the electron beam welding apparatus 165 moves along the convex ridges 125 of the positive collecting plate 120 as shown by an arrow ④. Therefore, it is possible to weld the convex ridges 125 to the bent portions 114b as shown in FIG. 7F. Accordingly, a large contact area can be ensured between the convex ridges 125 of the positive collecting plate 120 and the bent portions 114b, so that the convex ridges 125 and the bent portions 114b are sufficiently adhered to each other.

Figure 8A:
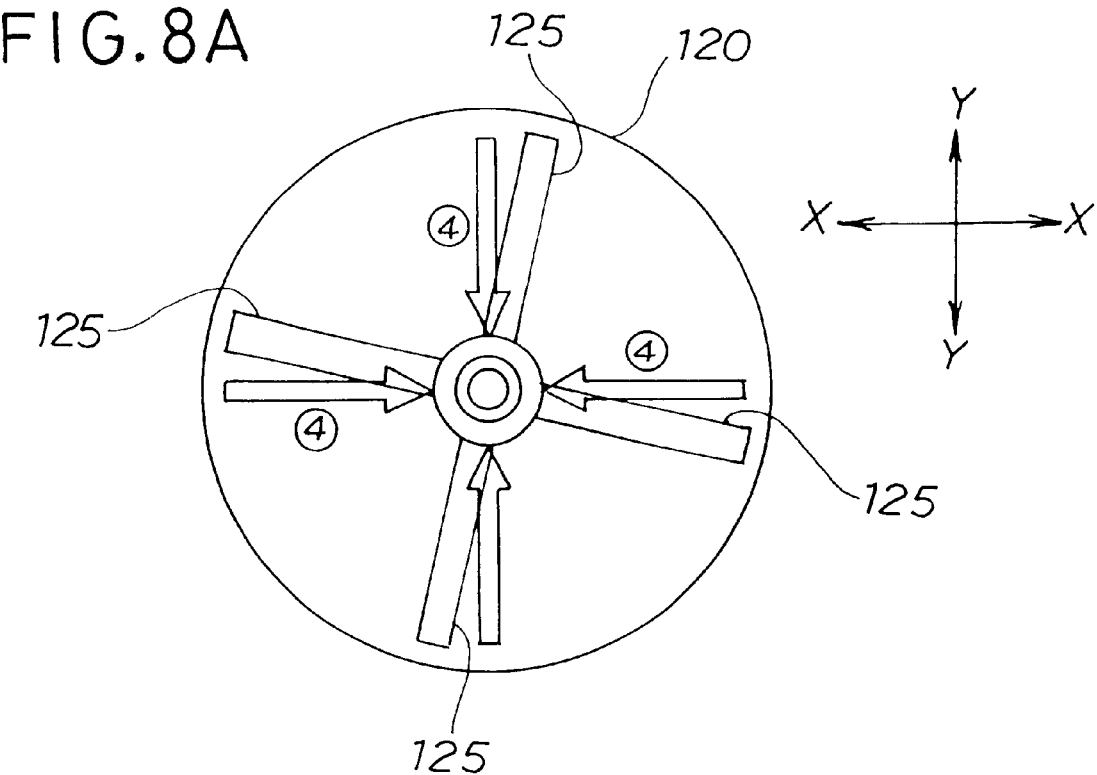
FIGS. 8A and 8B are views illustrating a state of welding when radial, convex ridges are positionally deviated from set movements of an electron beam welding apparatus.

In this manner, the electron beam welding apparatus 165 is set so as to move in a direction shown by the arrow ④ along the X-axis and Y-axis as shown in FIG. 7E. Therefore, when the convex ridges 125 on the positive collecting plate 120 are offset from the X-axis and Y-axis as shown in FIG. 8A, the electron beam welding apparatus 165 will move in a position offset from the convex ridges 125.

Figure 8B:
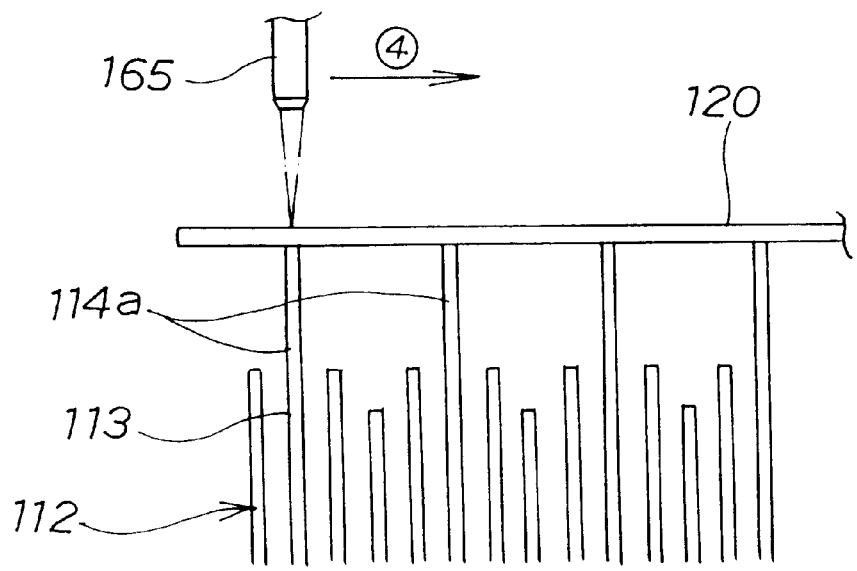

Then, the electron beam welding apparatus 165 becomes offset from the convex ridges 125 (see FIG. 8A) of the positive collecting plate 120 as shown in FIG. 8B, so that the electron beam welding apparatus 165 will perform welding on only a tip end of the positive electrode foil upper end 114a of the positive electrode plate 113. Therefore, a contact area between the convex ridges 125 on the positive collecting plate 120 and the positive electrode foil upper end 114a of the positive electrode plate 113 becomes small not to enable adequately ensuring close adherence between the convex ridges 125 and the positive electrode foil upper end 114a.

Figure 9A:
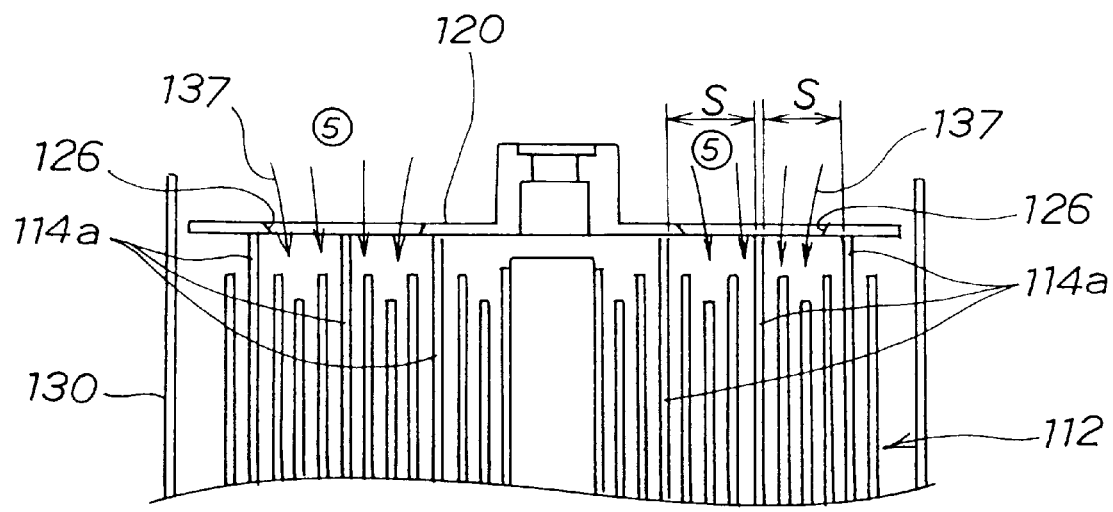
FIGS. 9A and 9B are views illustrating actions of the second embodiment and a comparative example when an electrolyte is filled into an interior of the electrode rolled body of the electric double layer capacitor.
Figure 9B:
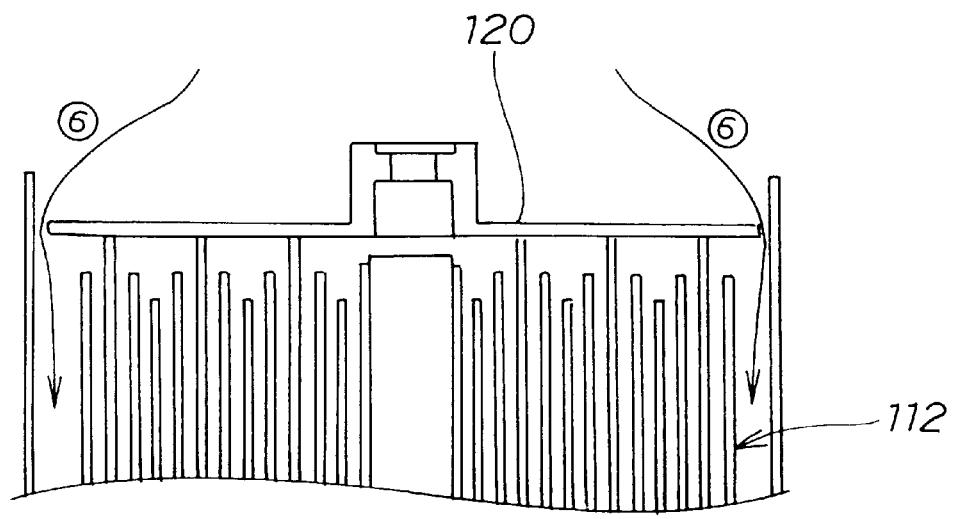

FIG. 9A schematically shows a second embodiment of the invention, and FIG. 9B shows a comparative example.

In FIG. 9A, openings 126 in the positive collecting plate 120 are positioned distant from bent portions 114b (see FIG. 5) on positive electrode foil upper ends 114a. Therefore, the openings 126 are positioned in spaces between the positive electrode foil upper ends 114a. Accordingly, when the electrolyte 137 is filled in, it rapidly enters and fills into the electrode rolled body 112 through the spaces between the positive electrode foil upper ends 114a from the openings 126 as shown by arrows ⑤.

As shown in FIG. 9B, however, if the openings 126 of the embodiment were not formed in the positive collecting plate 120. the electrolyte 137 would flow to an outer peripheral portion of the electrode rolled body 112 from an outer peripheral portion of the positive collecting plate 120, as shown by arrows ⑥. Therefore, it would be difficult to rapidly fill the electrolyte into the electrode rolled body 112 from a side of an upper end of the electrode rolled body 112, and it would take time in fully filling the electrolyte.

First and second modifications of the second embodiment will be described below.

Figure 10:
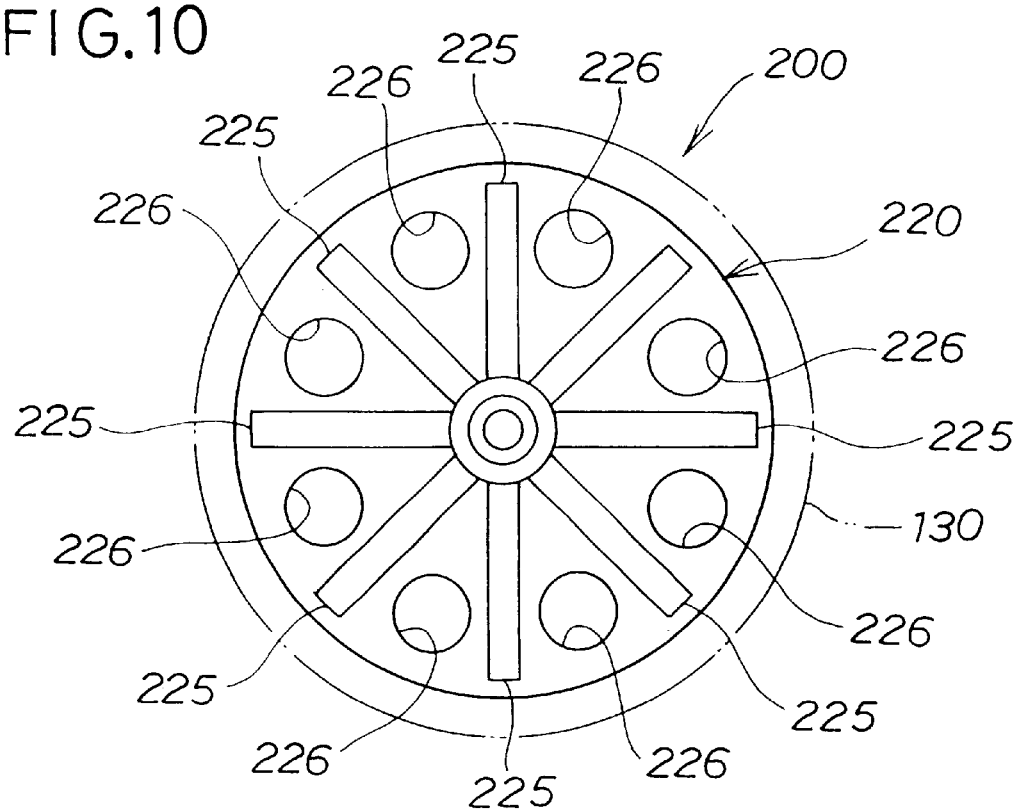
FIG. 10 is a plan view showing a first modification of the positive collecting plate in the electric double layer capacitor according to the second embodiment of the invention.

FIG. 10 is a plan view showing a positive collecting plate in an electric double layer capacitor according to the first modification.

In FIG. 10, a positive collecting plate 220 in an electric double layer capacitor 200 Is constructed to comprise eight radial, convex ridges 225 formed equidistantly, and eight openings 226 formed between adjacent convex ridges 225.

In this manner, with the first modification, the openings 226 are increased in number, and so are formed over the entire positive collecting plate 220 to permit an electrolyte to be efficiently filled into the electrode rolled body 112 (see FIG. 3). Further, an increase in number of the convex ridges 225 makes rigid mounting of the positive collecting plate 220 to the electrode rolled body 112.

Figure 11:
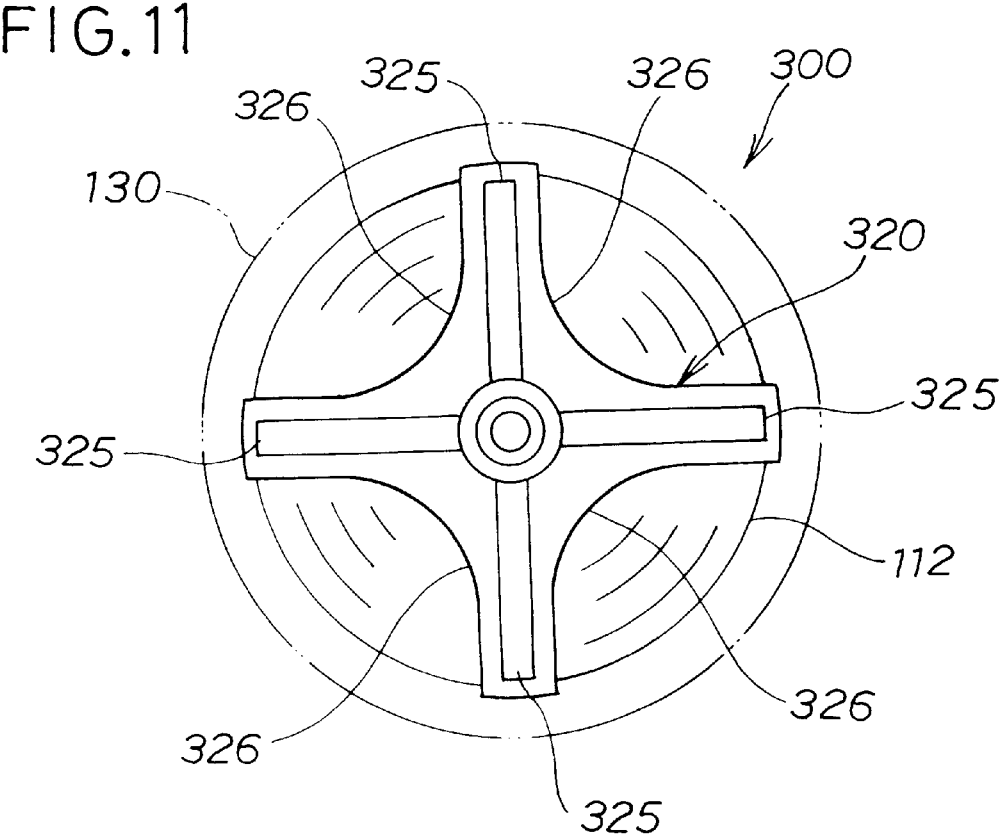
FIG. 11 is a plan view showing a second modification of the positive collecting plate in the electric double layer capacitor according to the second embodiment of the invention.

FIG. 11 is a plan view showing a positive collecting plate in an electric double layer capacitor according to the second modification.

A positive collecting plate 320 in an electric double layer capacitor 300 according to the second modification is cross-shaped by forming curved notches 326 from a disk. The cross-shaped, positive collecting plate 320 is formed with cross-shaped, convex ridges 325 so as to conform to its configuration. The notches 326 correspond to the openings 126 of the second embodiment and to the openings 226 of the first modification.

Thus notches 326 are formed to be curved to thereby provide large openings between adjacent convex ridges 325, so that an electrolyte can be efficiently filled into the electrode rolled body 112.

While the openings 126 or 226 shown in the second embodiment or in the first modification are examples in the form of a circle, the invention is not limited to the embodiment and the modification but a configuration of the openings may be, for example, rectangular or triangular.

The relationship between the cover 140 and the positive collecting plate 120 shown in FIG. 3 will be described hereinbelow with reference to FIGS. 12A to 14.

Figure 12A:
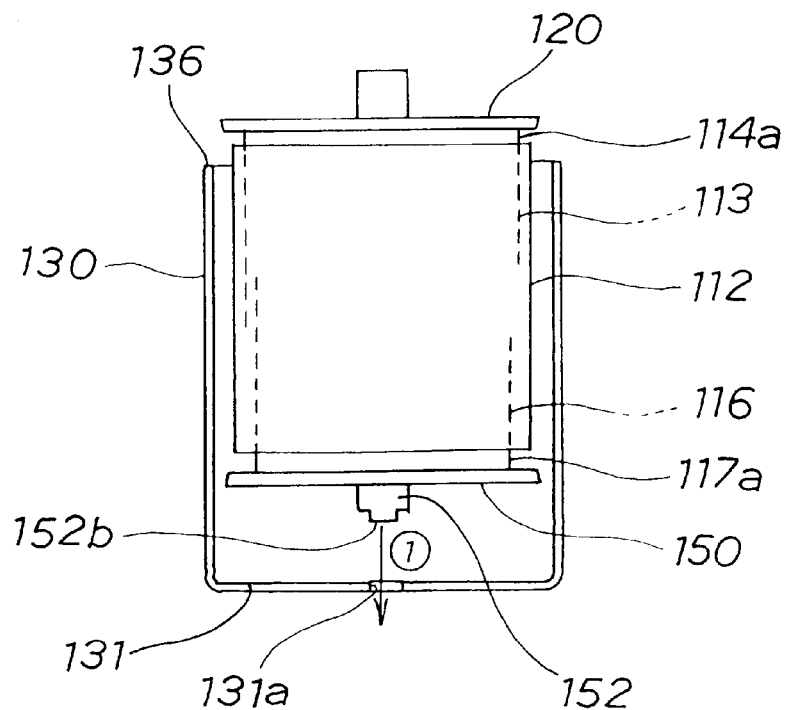
FIGS. 12A and 12B are views illustrating an action when the electrode rolled body is loaded in an outer packaging can.

In FIG. 12A, after the electrode rolled body 112 is wound in a rolled manner, the negative collecting plate 150 Is mounted to the negative electrode foil lower end 117a of the negative electrode plate 116, and the positive collecting plate 120 is mounted to the positive electrode foil upper end 114a of the positive electrode plate 113. Then, the electrode rolled body 112 in this state is received in the outer packaging can 130 through the opening 136, and the small diameter portion 152b of the projection 152 formed on the negative collecting plate 150 is inserted into the opening 131a formed in the bottom 131 of the outer packaging can 130 as shown by an arrow ①.

Figure 12B:
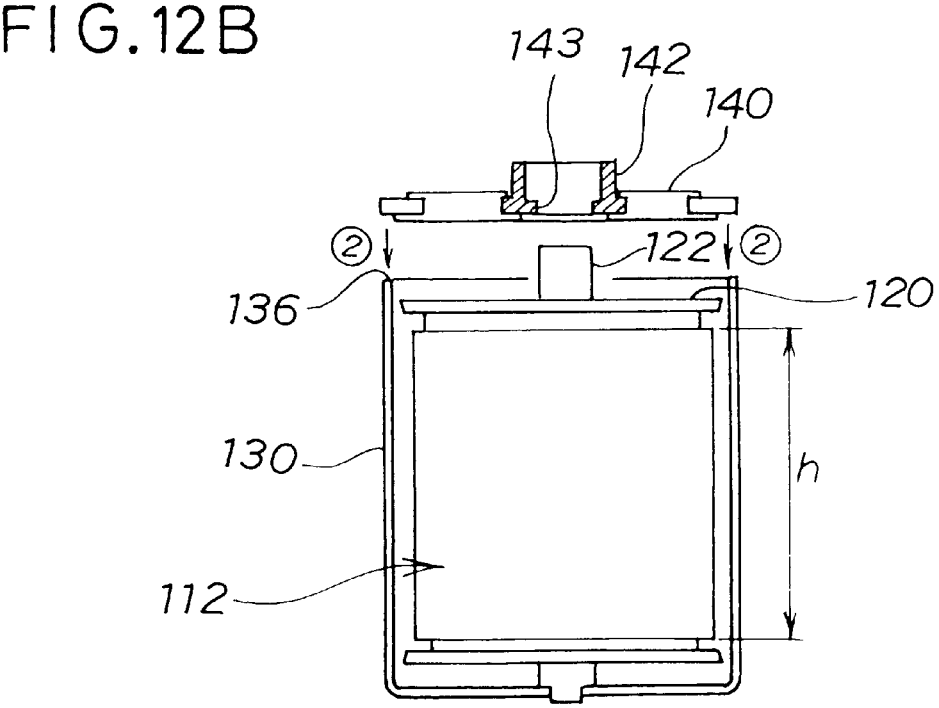

In FIG. 12B, the cover 140 is covered from above the outer packaging can 130 as shown by arrows ② to close the opening 136 of the outer packaging can 130. At the same time, the projection 122 on the positive collecting plate 120 is fitted into the insertion port 143 of the cylindrical portion 142 on the cover 140.

Figure 13:
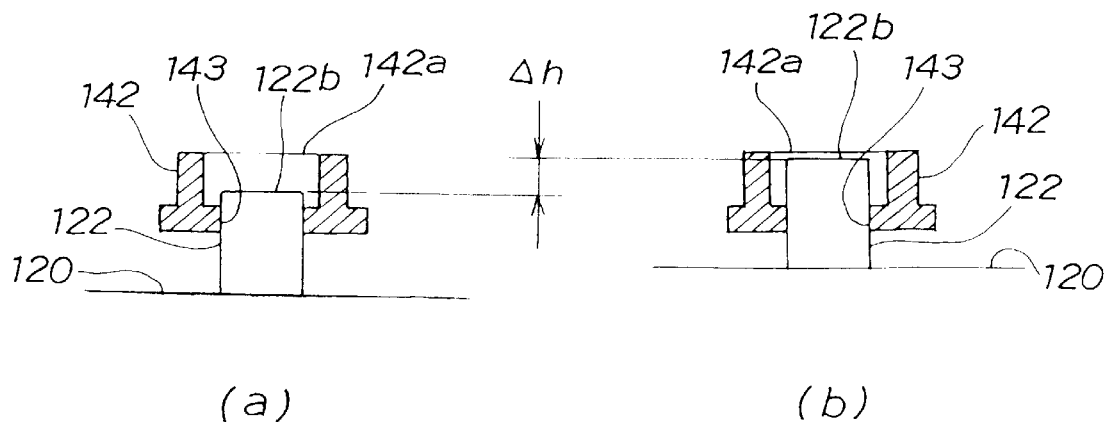
FIG. 13 is a view the relationship between a cylindrical-shaped portion and projections of the positive collecting plate.

In FIG. 13, (a) shows the relationship between the cylindrical portion 142 and the projection 122 when the electrode rolled body is minimum in manufacturing error, and (b) shows the same relationship when the electrode rolled body is maximum in manufacturing error.

In FIG. 13(a), when the electrode rolled body is minimum in manufacturing error, a dimension h of the electrode rolled body 112 shown in FIG. 12B becomes minimum. Accordingly, when the projection 122 on the positive collecting plate 120 is fitted into the insertion port 143 of the cylindrical portion 142, an upper end 122b of the projection 122 projects slightly above the insertion port 143 of the cylindrical portion 142. That is, the upper end 122b of the projection 122 enters sufficiently below an upper end 142a of the cylindrical portion 142.

In FIG. 13(b), when the electrode rolled body is maximum in manufacturing error, the dimension h of the electrode rolled body 112 shown in FIG. 12B becomes maximum. Accordingly, when the insertion port 143 of the cylindrical portion 142 is fitted onto the projection 122 on the positive collecting plate 120, the upper end 122b of the projection 122 enters near an upper end 142a of the cylindrical portion 142. That is, the upper end 122b of the projection 122 shown in (b) is positioned at a level higher than the upper end 122b of the projection 122 shown in (a) by Δh.

That is, when the manufacturing error of the electrode rolled body is in the range of Δh, the projection 122 does not project above the cylindrical portion 142, so that it is possible to accommodate the manufacturing error of the electrode rolled body. In other words, Δh of the manufacturing error of the electrode rolled body 112 (see FIG. 12B) is allowable.

Figure 14:
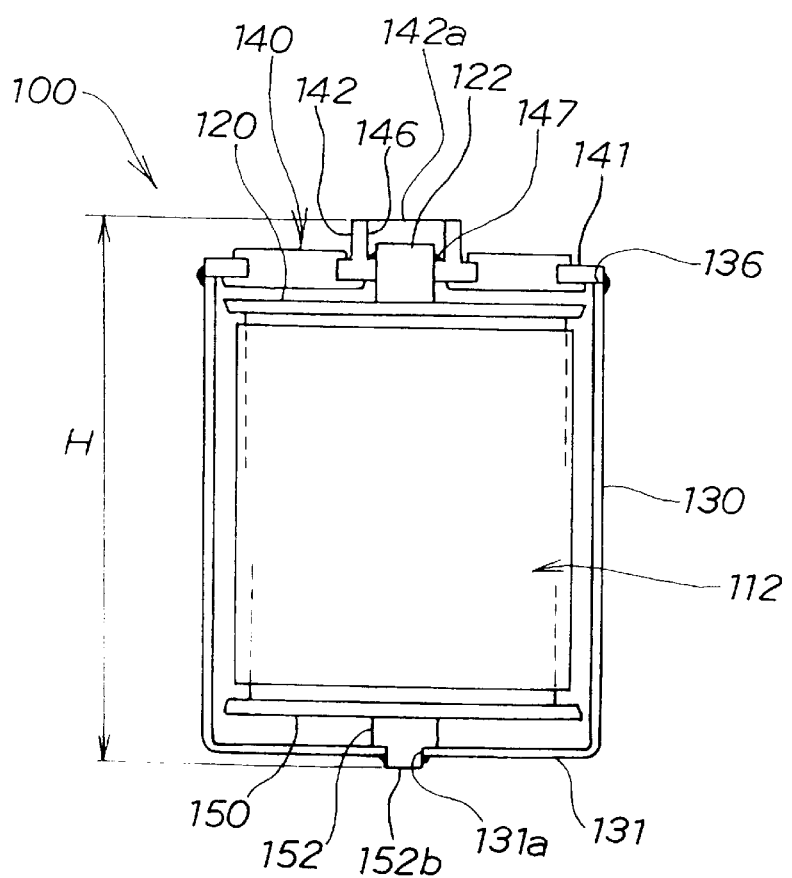
FIG. 14 is a schematic view showing an electric double layer capacitor in a state, in which welding is carried out at predetermined locations and sealing is effected after the electrode rolled body is loaded in the outer packaging can.
Figure 15:
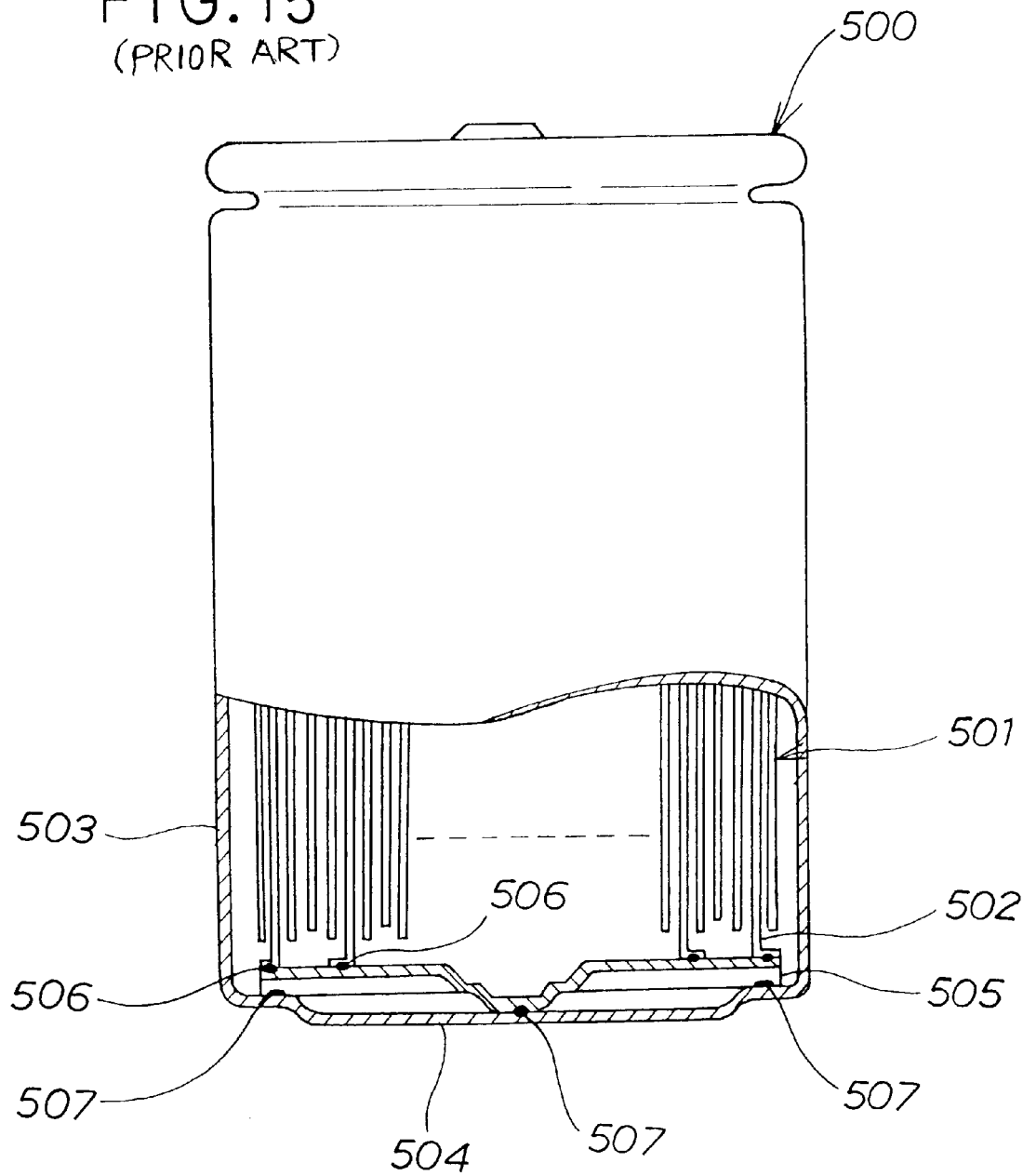
FIG. 15 is a cross sectional view showing part of a known electric double layer capacitor.
Figure 16:
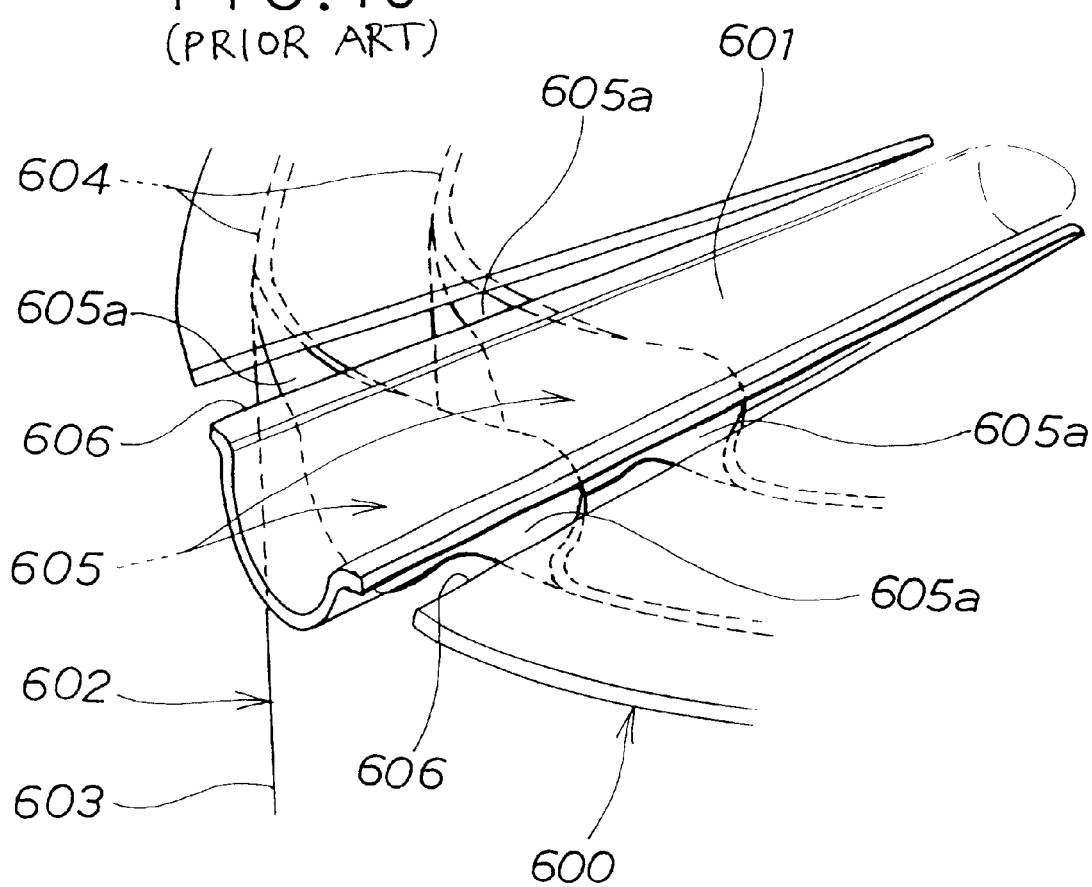
FIG. 16 is an enlarged, perspective view showing part of a positive collecting plate in the known double layer capacitor.
Figure 17:
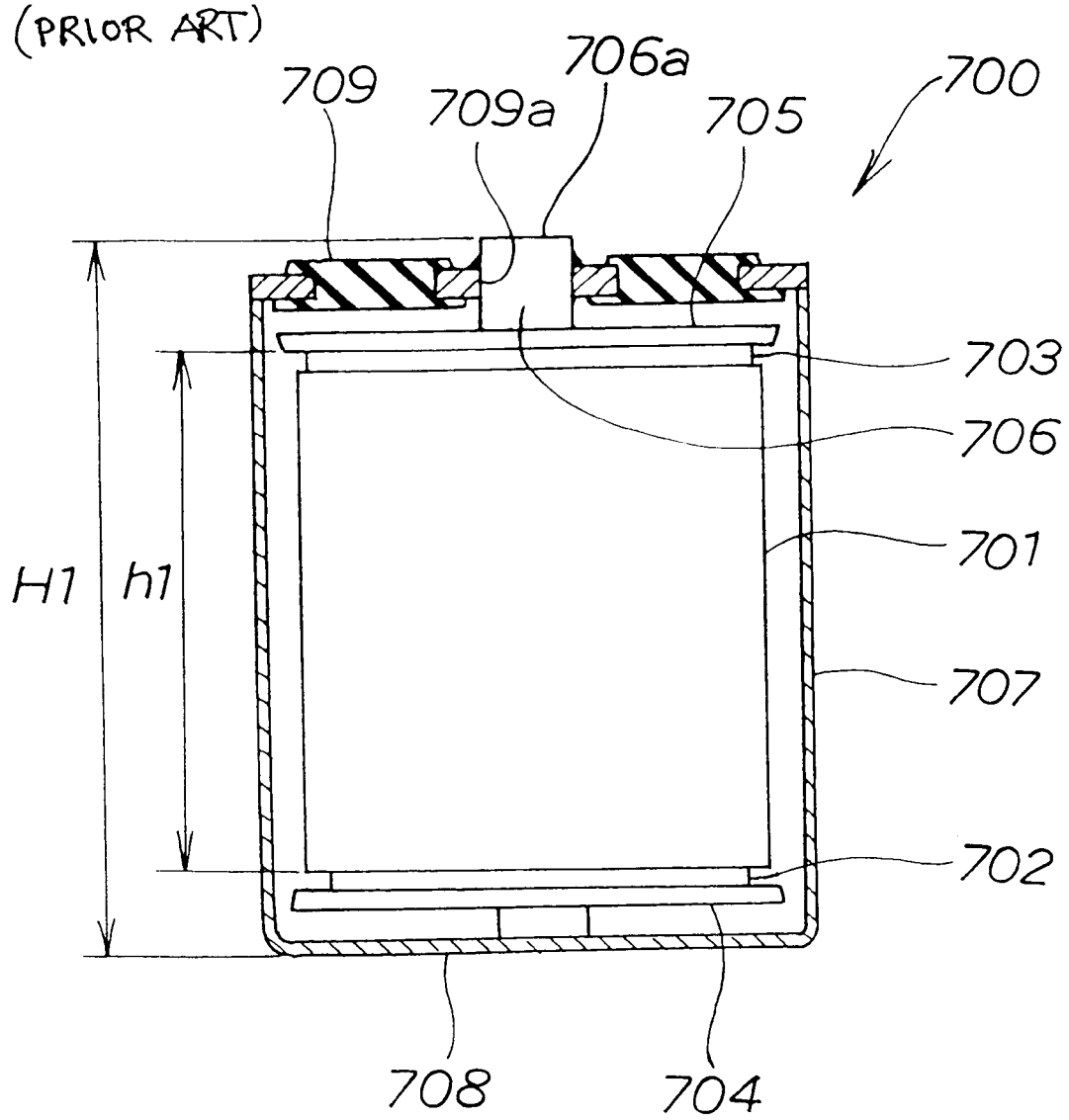
FIG. 17 is a cross sectional view showing the known double layer capacitor.

When the position of the electrode rolled body within the outer packaging can is determined, welding is performed on various locations as shown in FIG. 14.

In FIG. 14, welding is first applied between the opening 136 of the outer packaging can 130 and the ring 141 of the cover 140 to seal the opening 136. Then, welding is applied between the bottom 131 of the outer packaging can 130 and the small diameter portion 152b of the projection 152 to close the opening 131a. Further, the cylindrical portion 142 and the projection 122 are welded to each other at the inner peripheral surface 146 of the cylindrical portion 142 to seal a gap therebetween with the weld 147.

As a reference dimension H of the electric double layer capacitor 100 is set to a dimension between the bottom 131 of the outer packaging can 130 and the upper end 142a of the cylindrical portion 142, it is kept uniform unless the projection 122 projects above the upper end 142a of the cylindrical portion 14Z.

In this manner, even when the electrode rolled body 112 experiences manufacturing error, the manufacturing error of the electrode rolled body 112 can be accommodated by moving the projection 122 vertically within the cylindrical portion 142. Therefore, a relatively large manufacturing error Δh (see FIG. 13) is made allowable in manufacture of the electrode rolled body 112, and so the manufacture becomes easy.

As described above, the small diameter portion 12b of the negative collecting plate 150 is inserted into the opening 131a of the outer packaging can 130, and the outer packaging can 130 and the small diameter portion 152b are welded to each other. In addition, the projection 122 on the positive collecting plate 120 is inserted into the cylindrical portion 142 of the cover 140, and the projection 122 is welded to the cylindrical portion 142. Therefore, the lower end of the electrode rolled body 112 is rigidly mounted to the outer packaging can 130, and the upper end of the electrode rolled body 112 is rigidly mounted to the cover 140, whereby the vibration-proof quality of the electric double layer capacitor 100 is improved.

Further, because the projection 152 is formed on the negative collecting plate 150 and the small diameter portion 152b of the projection 152 is inserted into the opening 131a of the outer packaging can 130 to apply welding between the outer packaging can 130 and the small diameter portion 152b, a contact area between the outer packaging can 130 and the small diameter portion 152b becomes large. Therefore, contact portions between the respective parts allow flow of a relatively great electric current.

In the embodiment, while the opening 131a is formed in the bottom 131 of the outer packaging can 130 and the projection 152 (the small diameter portion 152b) of the negative collecting plate 150 is inserted into the opening 131a, the invention is not limited to such an arrangement and the projection 152 of the negative collecting plate 150 may not be inserted into the bottom 131 of the outer packaging can 130.

Obviously various minor changes and modifications of the present invention are possible in the light of the above teaching. It is therefore to be understood that within the scope of the appended claims, the invention may be practiced otherwise than as specifically described.

What is claimed is:

1. An electric double layer capacitor having an outer packaging can containing therein an electrode rolled body obtained by interposing a separator between a pair of a positive electrode plate having a positive electrode foil, on both sides of which an active substance is applied, and a negative electrode plate having a negative electrode foil, on both sides of which the active substance is applied, and winding them, characterized in that the negative electrode foil is electrically connected directly to a bottom of the outer packaging can, and the negative electrode foil has a greater thickness than that of the positive electrode foil, which is not electrically connected to the outer packaging can.

2. The electric double layer capacitor according to claim 1, wherein the bottom of the outer packaging can includes a plurality of convex ridges formed to extend inside thereof and radially toward an outer periphery thereof from a central portion thereof.

3. The electric double layer capacitor according to claim 2, wherein each of a plurality of the convex ridges is tapered to be increased in height toward an outer periphery thereof from a central portion thereof.

* * * * *

UNITED STATES PATENT AND TRADEMARK OFFICE
CERTIFICATE OF CORRECTION

PATENT NO.   : 6,552,894 B2
DATED        : April 22, 2003
INVENTOR(S)  : Matsuoka et al.

It is certified that error appears in the above-identified patent and that said Letters Patent is hereby corrected as shown below:

Title page,
Item [62], Related U.S. Application Data:
"Division of application No. 09/643,975, filed on Aug. 22, 2002," should read
-- Division of application No. 09/643,975, filed on Aug. 22, 2000, --

Column 1,
Line 4, "09/643,975, filed Aug. 22, 2002" should read -- 09/643,975, filed Aug. 22, 2000 --

Signed and Sealed this

Nineteenth Day of August, 2003

JAMES E. ROGAN
*Director of the United States Patent and Trademark Office*